United States Patent
Park et al.

(10) Patent No.: US 10,386,561 B2
(45) Date of Patent: Aug. 20, 2019

(54) DISPLAY DEVICE AND METHOD FOR MANUFACTURING THE SAME

(71) Applicant: Samsung Display Co., Ltd., Yongin-Si, Gyeonggi-Do (KR)

(72) Inventors: Chan-jae Park, Osan-si (KR); Seunghwan Baek, Seoul (KR); Sangduk Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 458 days.

(21) Appl. No.: 15/147,309

(22) Filed: May 5, 2016

(65) Prior Publication Data

US 2017/0097457 A1 Apr. 6, 2017

(30) Foreign Application Priority Data

Oct. 1, 2015 (KR) .......................... 10-2015-0138712

(51) Int. Cl.
*F21V 8/00* (2006.01)
(52) U.S. Cl.
CPC ........... *G02B 6/0026* (2013.01); *G02B 6/002* (2013.01); *G02B 6/0065* (2013.01)

(58) Field of Classification Search
CPC ..... G02B 6/002; G02B 6/0026; G02B 6/0065
See application file for complete search history.

(56) References Cited

U.S. PATENT DOCUMENTS

| 2012/0113672 A1 | 5/2012 | Dubrow et al. |
| 2015/0103291 A1* | 4/2015 | Li .................. G02B 6/0023 349/62 |

FOREIGN PATENT DOCUMENTS

| KR | 1020120009686 A | 2/2012 |
| KR | 1020120105953 A | 9/2012 |
| KR | 1020130120486 A | 11/2013 |

* cited by examiner

*Primary Examiner* — Thomas M Sember
(74) *Attorney, Agent, or Firm* — Cantor Colburn LLP

(57) ABSTRACT

A display device including a backlight unit and a display panel disposed on the backlight unit. The backlight unit includes a light guide plate, a wavelength conversion layer, and a cover member. The light source unit is disposed adjacent to a surface of the light guide plate. The wavelength conversion layer is disposed between the light source unit and the light guide plate, and contacts the surface of the light guide plate. The cover member is disposed between the light source unit and the light guide plate, and seals the wavelength conversion layer.

20 Claims, 7 Drawing Sheets

DISPLAY DEVICE AND METHOD FOR MANUFACTURING THE SAME

This application claims priority to Korean Patent Application No. 10-2015-0138712, filed on Oct. 1, 2015, and all the benefits accruing therefrom under 35 U.S.C. § 119, the content of which in its entirety is herein incorporated by reference.

BACKGROUND

1. Field

The disclosure herein relates to a display device and a method for manufacturing the display device, and more particularly, to a display device with improved light output efficiency and a method for manufacturing the display device.

2. Description of the Related Art

Currently known display devices include a liquid crystal display ("LCD") device, a plasma display panel ("PDP") device, an organic light emitting diode display ("OLED") device, a field effect display ("FED") device, an electrophoretic display device, and the like.

The LCD device is a light receiving type device that may not generate light itself and thus typically includes a separate light source. In recent years, to enhance the color sensitivity and color reproduction rate of the LCD device, technology using a wavelength conversion member such as a quantum dot has been studied.

SUMMARY

The disclosure provides a display device with improved light output efficiency.

The invention also provides a method for manufacturing a display device with improved light output efficiency.

According to an embodiment of the inventive concept, a display device includes a backlight unit and a display panel disposed on the backlight unit. In such an embodiment, the backlight unit includes a light guide plate, a wavelength conversion layer, and a cover member. In such an embodiment, the light source unit is disposed adjacent to a surface of the light guide plate. In such an embodiment, the wavelength conversion layer is disposed between the light source unit and the light guide plate and contacts the surface of the light guide plate. In such an embodiment, the cover member is disposed between the light source unit and the light guide plate and seals the wavelength conversion layer.

In an embodiment, the light guide plate may include: a light incident surface; a light opposite surface facing the light incident surface; an emission surface connected to the light incident surface and the light opposite surface; and a rear surface facing the emission surface. In such an embodiment, the wavelength conversion layer may contact the light incident surface.

In an embodiment, the cover member may include an accommodation groove which accommodates the wavelength conversion layer.

In an embodiment, the wavelength conversion layer may include: a first surface contacting the light guide plate; a second surface facing the first surface; a third surface connected to the first surface and the second surface; and a fourth surface facing the third surface.

In an embodiment, the display device may further include a reflective member disposed between the wavelength conversion layer and the cover member. In such an embodiment, the reflective member may be disposed between the third surface and the cover member and between the fourth surface and the cover member.

In an embodiment, the cover member may cover the second surface, the third surface, and the fourth surface.

In an embodiment, the cover member may include a cover part and a connecting part. In such an embodiment, the cover part may cover a portion of the third surface, a portion of the fourth surface, and the second surface. In such an embodiment, the connecting part may cover the remaining portion of the third surface and the remaining portion of the fourth surface and connect the cover part to the light guide plate.

In an embodiment, the cover part may include glass.

In an embodiment, the connecting part may include frit.

In an embodiment, the wavelength conversion layer may include a resin layer and a wavelength conversion member disposed in the resin layer.

In an embodiment, the wavelength conversion member may be a phosphor or a quantum dot.

In an embodiment, the wavelength conversion member may include a Group II-VI based semiconductor compound or a Group III-V based semiconductor compound.

In an embodiment, wavelength conversion member may not include cadmium (Cd).

In an embodiment, the light source unit may emit blue light.

In an embodiment, the light source unit may include: a light source accommodation part; and a light source disposed in the light source accommodation part and which provides light.

In an embodiment, the display device may further include a phosphor disposed in the light source accommodation part and on the light source.

In an embodiment of the inventive concept, a method for manufacturing a display device includes preparing a backlight unit and providing a display panel on the backlight unit. The preparing of the backlight unit includes: preparing a substrate; forming a cover member by forming an accommodation groove in the substrate; providing a wavelength conversion layer to the accommodation groove; and attaching the cover member to the light guide plate in a way such that the wavelength conversion layer contacts the light guide plate.

In an embodiment, the forming of the cover member may include: forming a cover part by the forming the accommodation groove in the substrate; providing frit on the cover part; and plastic-curing the frit provided on the cover part.

In an embodiment, the attaching of the cover member to the light guide plate may include applying a laser to the frit.

In an embodiment, the providing of the wavelength conversion layer may include: applying the wavelength conversion layer on the accommodation groove; and ultraviolet ("UV") curing the wavelength conversion layer applied on the accommodation groove.

In an embodiment, the substrate may include glass, and the wavelength conversion layer may include a phosphor or a quantum dot.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
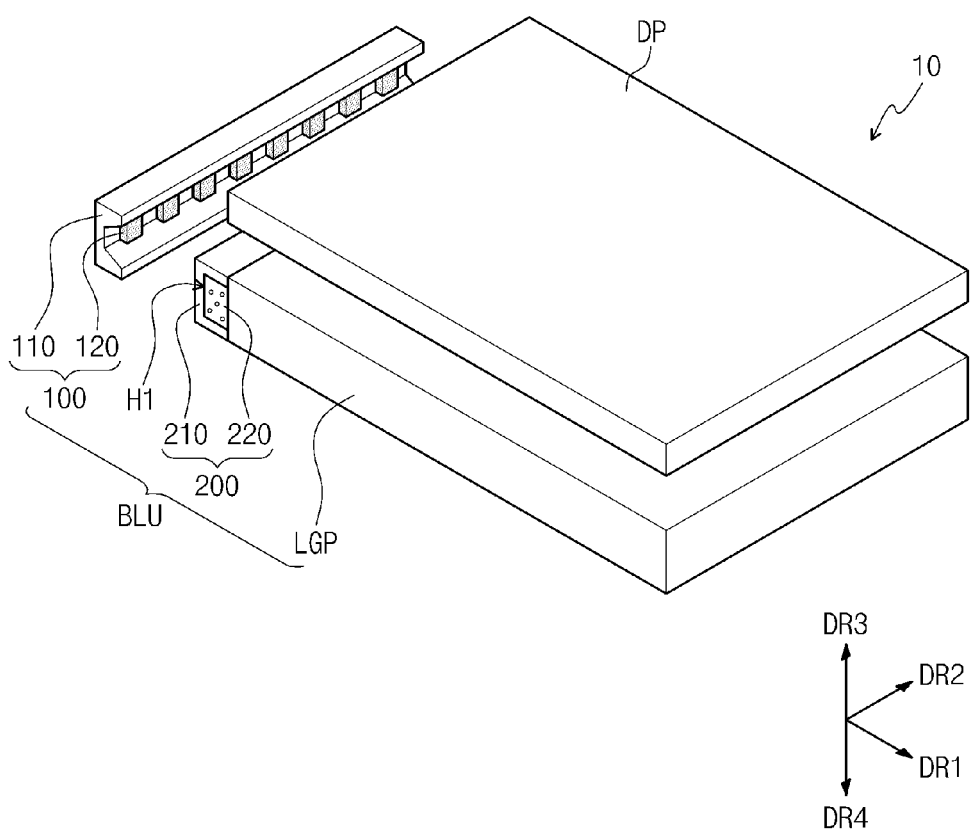
FIG. 1 is a schematic perspective view of an embodiment of a display device according to the inventive concept.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a schematic perspective view of an embodiment of a display device according to the inventive concept.

Referring to FIG. 1, an embodiment of a display device 10 includes a backlight unit BLU and a display panel DP disposed on the backlight unit BLU. The backlight unit BLU and the display panel DP may be stacked in a third direction DR3, which is a thickness direction of the display panel DP.

The display panel DP is disposed on the backlight unit BLU. The display panel DP receives light to display an image. The display panel 100, which is a light receiving type display panel, may include at least one of various display panels such as a liquid crystal display panel, a plasma display panel, an electrophoretic display panel, a micro electromechanical system display panel, and an electrowetting display panel. Hereinafter, embodiment, where the display panel 100 is the liquid crystal display panel will be described in detail, for convenience of description, but the invention is not limited thereto.

In such an embodiment, the liquid crystal display panel may be one of a vertical alignment ("VA") mode panel, an in-plane switching ("IPS") mode panel, a fringe-field switching ("FFS") mode panel, and a plane to line switching ("PLS") mode panel, but the inventive concept is not limited thereto.

The backlight unit BLU provides light to the display panel DP. The backlight unit BLU includes a light guide plate LGP, a light source unit 100, a cover member 210 and a wavelength conversion layer 220.

The light guide plate LGP may be disposed below the display panel DP. The light guide plate LGP guides light provided from the light source unit 100 to emit the light toward the display panel DP. The light incident into the light guide plate LGP is emitted toward the display panel DP through an emission surface s3 of the light guide plate LGP.

In an embodiment, the light guide plate LGP may include or be made of a transparent polymer resin such as polycarbonate, polymethyl methacrylate, polydimethylsiloxane, polystyrene and methacrylate styrene, for example, but the inventive concept is not limited thereto.

Figure 2:
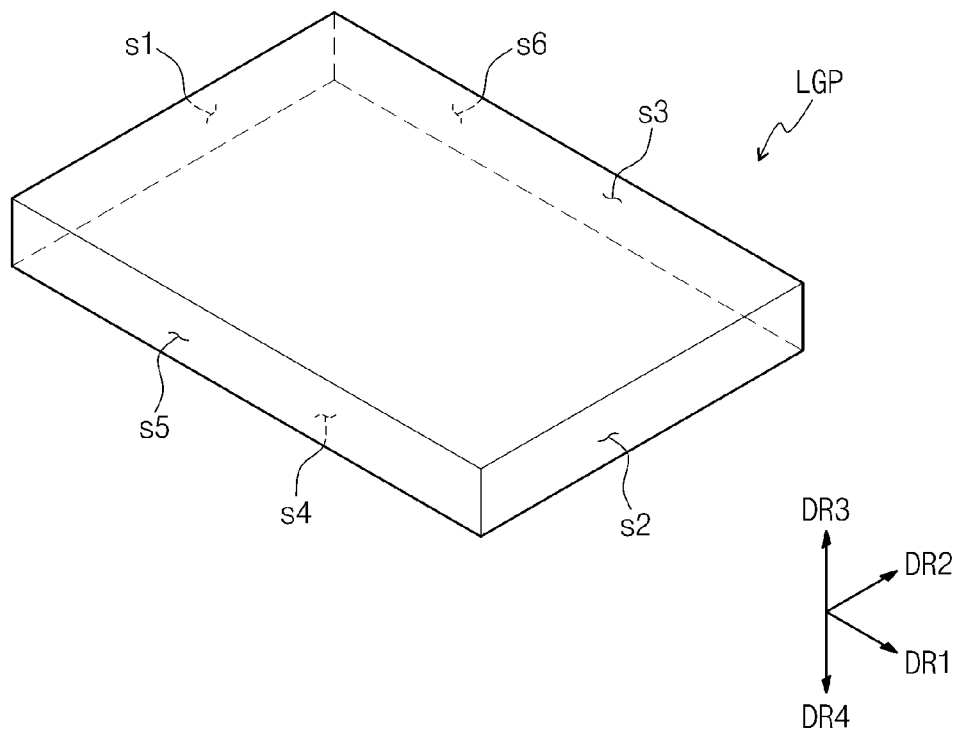
FIG. 2 is a schematic perspective view of an embodiment of a light guide plate of the display device according to the inventive concept.

FIG. 2 is a schematic perspective view of an embodiment of the light guide plate of the display device according to the inventive concept.

Referring to FIGS. 1 and 2, in an embodiment, the light guide plate LGP guides the light provided from the light source unit 100 to emit the light. The light guide plate LGP guides the light provided from the light source unit 100 toward the display panel DP. The light incident into the light guide plate LGP is emitted toward the display panel DP through the emission surface s3 of the light guide plate LGP. The light guide plate LGP includes a light incident surface s1, a light opposite surface s2, the emission surface s3, a rear surface s4, a first side surface s5, and a second side surface s6.

The light incident surface s1 receives light from the light source unit 100. The light incident surface s1 is disposed adjacent to the light source unit 100. The light incident surface s1 is connected to the emission surface s3, the rear surface s4, the first side surface s5 and the second side surface s6. The light incident surface s1 faces the light opposite surface s2.

The light opposite surface s2 faces the light incident surface s1. In one embodiment, for example, the light opposite surface s2 may be spaced apart from the light incident surface s1 in a first direction DR1, which may be a length direction of the light guide plate LGP. The light opposite surface s2 is connected to the emission surface s3, the rear surface s4, the first side surface s5 and the second side surface s6.

The emission surface s3 emits light received by the light incident surface s1. The emission surface s3 is disposed adjacent to the display panel DP. The emission surface s3 is connected to the emission surface s1, the light opposite surface s2, the first side surface s5 and the second side surface s6. The emission surface s3 faces the rear surface s4.

The rear surface s4 faces the emission surface s3. In one embodiment, for example, the rear surface may be spaced apart from the emission surface s3 in a fourth direction DR4, which is a direction opposite to the third direction DR3. The rear surface s4 is connected to the light incident surface s1, the light opposite surface s2, the first side surface s5, and the second side surface s6.

The first side surface s5 is connected to the light incident surface s1, the light opposite surface s2, the emission surface s3, and the rear surface s4. The second side surface s6 may be spaced apart from the first side surface s5 in a second direction DR2, which is a width direction of the light guide plate LGP. The second side surface s6 is connected to the light incident surface s1, the light opposite surface s2, the emission surface s3 and the rear surface s4.

Although not shown, the light guide plate LGP may include optical patterns. The optical patterns may total-reflect light. In one embodiment, for example, the optical patterns may be disposed on at least one of the emission surface s3 and the rear surface s4.

In an embodiment, each of the optical patterns may have a circular shape on a plane, but the inventive concept is not limited thereto. In one embodiment, for example, each of the optical patterns may have at least one of various shapes such as a triangular shape, a rectangular shape and an oval shape on the plane. Each of the optical patterns may have, e.g., a protruding or recessed shape when viewed from the third direction DR3.

Figure 3:
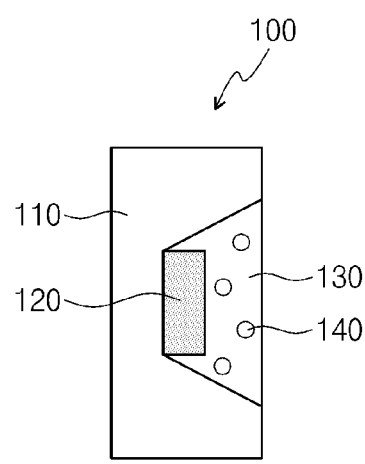
FIG. 3 is a schematic cross-sectional view of an embodiment of a light source unit of the display device according to the inventive concept.

FIG. 3 is a schematic cross-sectional view of an embodiment of the light source unit of the display device according to the inventive concept.

Referring to FIGS. 1 and 3, an embodiment of the light source unit 100 is disposed adjacent to one surface of the light guide plate LGP. The light source unit 100 may be disposed closer to the light incident surface s1 of the light guide plate LGP than the light opposite surface s2 of the light guide plate LGP.

The light source unit 100 may include a light source 120 and a light source accommodating part 110 for accommodating the light source 120 and applying power to the light source 120. The light source 120 may be, e.g., light emitting diodes ("LED"). The light source 120 may be provided in plural and spaced apart from each other in the second direction DR2 to be accommodated in the light source accommodating part 110. The light source 120 may provide, e.g., a blue light. In one embodiment, for example, the light source 120 may provide the blue light, and the wavelength conversion layer 220 may include a quantum dot that emits red excitation light and a quantum dot that emits green excitation light.

In an embodiment of the display device 10 according to the inventive concept, as shown in FIG. 1, the light source unit 100 is disposed to face only one of side surfaces of the light guide plate LGP, but the inventive concept is not limited thereto. In one alternative embodiment, for example, the display device 10 may include a plurality of light source units disposed along a plurality of side surfaces of the light guide plate LGP, respectively.

According to an embodiment of the inventive concept, as shown in FIG. 1, the display device 10 includes an edge-type light source unit 100, but the inventive concept is not limited thereto. In one alternative embodiment, for example, the display device 10 may include a direct-type light source unit 100.

The light source unit 100 may further include a light source resin layer 130 and a phosphor 140. In one embodiment, for example, the light source resin layer 130 may include a photoresist resin. In one embodiment, for example, the light source resin layer 130 may include at least one of a monomer and an oligomer. However, in such an embodiment of the inventive concept, the material of the light source resin layer 130 is not limited to those described above.

The phosphor 140 may receive light from the light source 110 to emit the light. The phosphor 140 is disposed in the light source resin layer 130. The phosphor 140 is accommodated in the light source accommodating part 110. The phosphor 140 may be disposed on the light source 120. In one embodiment, for example, the light source 120 may provide blue light, the phosphor 140 may be a red phosphor, and the wavelength conversion layer 220 may include a quantum dot that generates green excitation light.

Referring to FIGS. 1 to 3, the wavelength conversion layer 220 may be disposed between the light source unit 100 and the light guide plate LGP. The wavelength conversion layer 220 contacts the light guide plate LGP. The wavelength conversion layer 220 is sealed by a cover member 210 and is not exposed to the outside.

The cover member 210 is disposed between the light source unit 100 and the light guide plate LGP. The cover member 210 seals the wavelength conversion layer 220. The cover member 210 covers the wavelength conversion layer 220 to prevent the wavelength conversion layer 220 from being exposed to the outside. The wavelength conversion layer 220 and the cover member 210 will be described later in greater detail.

Although not shown, an optical member may be disposed between the display panel DP and the light guide plate LGP. The optical member improves luminance and viewing angle of light emitted from the emission surface s3 of the light guide plate LGP. The optical member may include a first optical sheet, a second optical sheet and a third optical sheet, which are sequentially disposed or laminated one on another. Each of the first optical sheet, the second optical sheet, and the third optical sheet may be flexible or bent.

The first optical sheet may be a diffusion sheet for diffusing light emitted from the light guide plate LGP. The second optical sheet may be a prism sheet that collects the light diffused by the diffusion sheet in a direction that is perpendicular to a plane of the display panel DP disposed above the second optical sheet or the thickness direction of the display panel DP. The third optical sheet may be a protective sheet for protecting the prism sheet against an external impact. At least one of the first optical sheet, the second optical sheet, and the third optical sheet may be provided in plural to overlap each other. Alternatively, at least one sheet may be omitted.

Although not shown, the backlight unit BLU may further include a reflective sheet. The reflective sheet may be disposed below the light guide plate LGP. The reflective sheet may reflect light that leaks without traveling toward the display panel DP to change a path of the light in a way such that the reflected light travels toward the display panel DP. Thus, the reflective sheet increases an amount of the light provided to the display panel DP.

Although not shown, an embodiment of the display device 10 may further include a bottom chassis. The bottom chassis may be disposed below the backlight unit BLU. The bottom chassis may accommodate constitutive components of backlight unit BLU and the display panel DP.

Although not shown, an embodiment of the display device 10 may further include a mold frame. The mold frame may be disposed between the display panel DP and the backlight unit BLU. The mold frame may be disposed along an edge of the display panel DP to support a lower portion of the display panel DP.

Figure 4A:
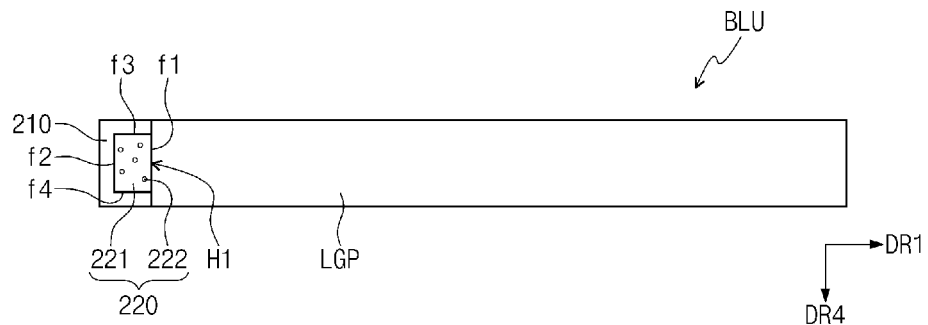
FIGS. 4A, 4B, and 4C are schematic cross-sectional views illustrating a portion of an embodiment of a backlight unit of the display device according to the inventive concept.
Figure 4B:
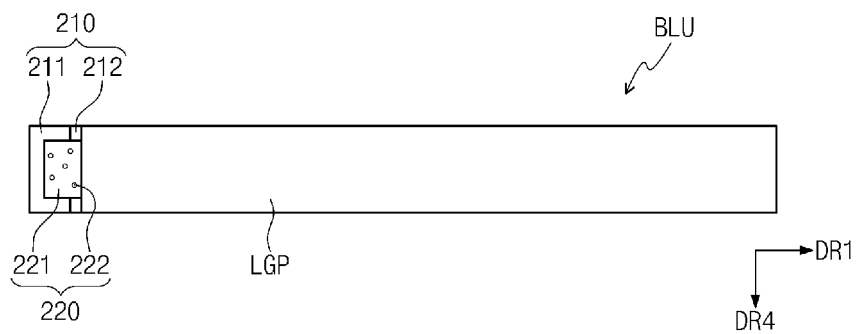
Figure 4C:
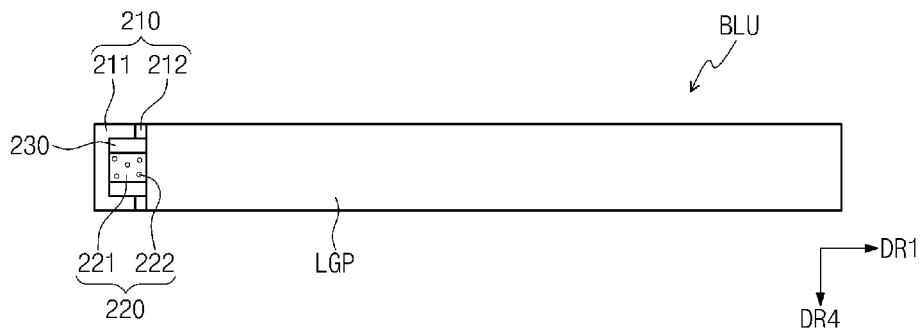

FIGS. 4A, 4B and 4C are schematic cross-sectional views illustrating a portion of an embodiment of the backlight unit of the display device according to the inventive concept.

As described above, referring to FIGS. 1, 4A, 4B, and 4C, the wavelength conversion layer 220 is disposed between the light source unit 100 and the light guide plate LGP. The wavelength conversion layer 220 contacts the light guide plate LGP. The wavelength conversion layer 220 contacts the light incident surface s1 of the light guide plate LGP.

The wavelength conversion layer 220 may convert a wavelength band of light from the light source unit 100 into a longer wavelength band. In an embodiment, as shown in FIG. 4A, the wavelength conversion layer 220 may include a first surface f1, a second surface f2, a third surface f3 and a fourth surface f4 on a cross section. The first surface f1 may contact the light guide plate LGP. The first surface f1 may contact the light incident surface s1 of the light guide plate LGP. The first surface f1 may be spaced apart from the second surface f2 in the first direction DR1. The second surface f2 faces the first surface f1. The third surface f3 is connected to the first surface f1 and the second surface f2. The fourth surface f4 faces the third surface f3 and is connected to the first surface f1 and the second surface f2. The fourth surface f4 is spaced apart from the third surface f3 in the fourth direction DR4.

The wavelength conversion layer 220 may include a resin layer 221 and a wavelength conversion member 222 disposed in the resin layer 221. Although not shown, the resin layer 221 may further include at least one of a ultraviolet ("UV") initiator, a dispersing agent, a deforming agent, and a scattering member. In such an embodiment of the inventive concept, the material of the resin layer 221 is not limited to those described above. In one alternative embodiment, for example, the resin layer 221 may include a silicon resin or a photoresist resin. In one embodiment, for example, the resin layer 221 may include at least one of a monomer and an oligomer.

The wavelength conversion member 222 may absorb light in a predetermined wavelength band to emit optical energy that is absorbed while returning to a ground state from an excited state. The wavelength conversion member 222 includes a phosphor or a quantum dot. In one embodiment, for example, the wavelength conversion member 222 may include oxynitride, nitride, silicate, aluminated, scandate, or an oxyfluoride.

In an embodiment, the wavelength conversion member 222 is the phosphor and includes β-SiAlON ($Si_{6-z}AL_zO_zN_{8-z}$), $(Ba,Sr)_2SiO_4$:Eu, or $CaSc_{20}$:Ce, such that the wavelength conversion member 222 may emit excited light in a green wavelength band. In an embodiment, the wavelength conversion member 222 is the phosphor and includes $CaAlSiN_3$:Eu, $(Sr,Ca)AlSiN_3$:Eu, or $CaAlSi(ON)_3$:Eu, such that the wavelength conversion member 222 may emit excited light in a red wavelength band. In an embodiment, the wavelength conversion member 222 is the phosphor and includes $Y_3Al_5O_{12}$:Ce or $Tb_3Al_5O_{12}$:Ce, such that the wavelength conversion member 222 may emit excited light in a yellow wavelength band. In an embodiment, where blue light is provided from the backlight unit BLU, and the wavelength conversion member 222 is the phosphor and includes $Y_3Al_5O_{12}$:Ce or $Tb_3Al_5O_{12}$:Ce, excited light emitted from the wavelength conversion member 222 and the blue light may be mixed to emit white light.

In an embodiment, where the wavelength conversion member 222 is a quantum dot, the wavelength conversion member 222 may include a Group II-VI based semiconductor compound or quantum dot including ZnSe/ZnS or ZnTe/ZnSe. The wavelength conversion member 222 may include a Group III-V based semiconductor compound or quantum dot including InP/ZnS or a quantum dot including CuInS(2)/ZnS. The wavelength conversion member 222 may not include cadmium (Cd).

In an embodiment, where the wavelength conversion member 222 includes the quantum dot, the wavelength band of the excited light may be changed according to a size of the quantum dot. In one embodiment, for example, the excited light of the quantum dot may be red light, green light, or blue light according to the size of the quantum dot.

The cover member 210 may be disposed between the light source unit 100 and the light guide plate LGP. The cover member 210 seals the wavelength conversion layer 220. The cover member 210 covers the wavelength conversion layer 220 to prevent the wavelength conversion layer 220 from being exposed to the outside. The cover member 210 may cover the second, third, and fourth surfaces f2, and f4 of the wavelength conversion layer 220.

The cover member 210 includes an accommodation groove H1. The wavelength conversion layer 220 is accommodated in the accommodation groove H1. The cover member 210 may have, e.g., a U-like shape on a cross section.

In an embodiment, as shown in FIG. 4B, the cover member 210 may include a cover part 211 and a connecting part 212. The cover part 211 may cover a portion of the third surface f3, a portion of the fourth surface f4, and the second surface f2. The cover part 211 includes a groove. A portion of the wavelength conversion layer 220 is accommodated in the groove. The cover part 211 may have, e.g., a U-like shape on the cross section. The cover part 211 may be provided as a single unitary and indivisible body or unit. In one embodiment, for example, the cover part 211 may include or be formed of glass, but not being limited thereto.

The connecting part 212 may cover the remaining portion of the third surface f3 and the remaining portion of the fourth surface f4. The connecting part 212 may connect the cover part 211 to the light guide plate LGP. In one embodiment, for example, the connecting part 212 may include frit, but not being limited thereto. The frit may be plastic-worked to connect the cover part 211 to the light guide plate LGP.

Referring to FIG. 4C, an embodiment of the display device 10 may further include a reflective member 230. The reflective member 230 may reflect light that leaks without traveling toward the light incident surface s1 to change a path of the light in a way such that the reflected light travels toward the light incident surface s1. The reflective member 230 may reflect the light toward the wavelength conversion layer 220. The reflective member 230 may be disposed between the wavelength conversion layer 220 and the cover member 210. The reflective member 230 is accommodated in the accommodation groove H1. The reflective member 230 may be disposed between the third surface f3 and the cover member 210 and between the fourth surface f4 and the cover member 210.

In one embodiment, for example, the reflective member 230 may include at least one selected from $TiO_2$, $SiO_2$, $Al_2O_3$ and polymer, but not being limited thereto.

In a conventional display device including the wavelength conversion layer, since the wavelength conversion layer does not contact the light guide plate, light having a converted wavelength is not effectively provided to the light guide plate and thus leaked. Accordingly, an amount of light provided to the display panel is small such that light emission efficiency of the display device is decreased.

In an embodiment of the display device according to the inventive concept, the wavelength conversion layer contacts the light guide plate, such that the light having the converted wavelength is effectively provided to the light guide plate and thus leaked may be reduced. Accordingly, the amount of the light provided to the display panel increases to enhance the light emission efficiency of the display device.

Hereinafter, an embodiment of a method for manufacturing the display device according to the inventive concept will be described.

Figure 5:
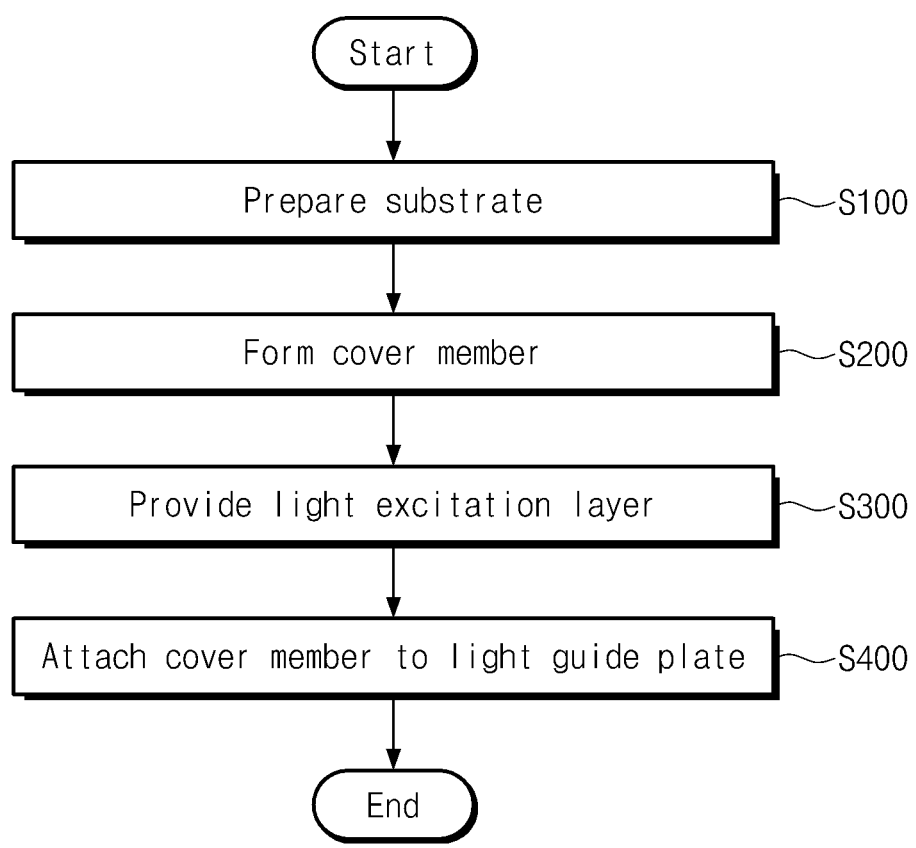
FIG. 5 is a flowchart sequentially illustrating an embodiment of a method for manufacturing the display device according to the inventive concept.

FIG. 5 is a flowchart sequentially illustrating an embodiment of the method for manufacturing the display device according to the inventive concept. FIGS. 6A, 6B, 6D, and 6F are plan views sequentially illustrating an embodiment of the method for manufacturing the display device according to the inventive concept. FIGS. 6C, 6E, 6G, and 6H are cross-sectional views sequentially illustrating an embodiment of the method for manufacturing the display device according to the inventive concept. The same or like elements shown in FIGS. 5 to 6H have been labeled with the same reference characters as used above to describe the embodiments of the display device shown in FIGS. 1 to 4, and any repetitive detailed description thereof will hereinafter be omitted or simplified.

Referring to FIGS. 1 and 5, an embodiment of the method for manufacturing the display device includes preparing the backlight unit BLU and providing the display panel DP on the backlight unit BLU. The preparing of the backlight unit BLU may include preparing a substrate SUB (S100), forming the accommodation groove H1 in the substrate SUB to form the cover member 210 (S200), providing the wavelength conversion layer 220 in the accommodation groove H1 (S300), and attaching the cover member 210 to the light guide plate LGP in a way such that the wavelength conversion layer 220 contacts the light guide plate LGP (S400).

Figure 6A:
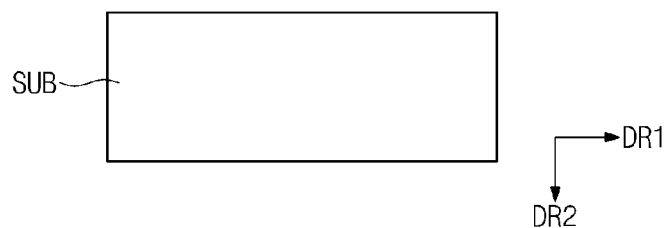
FIGS. 6A, 6B, 6D, and 6F are plan views sequentially illustrating an embodiment of the method for manufacturing the display device according to the inventive concept.
Figure 6B:
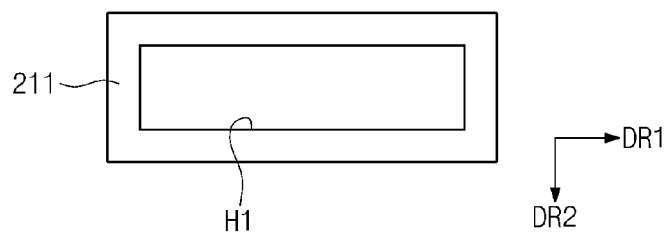
Figure 6C:
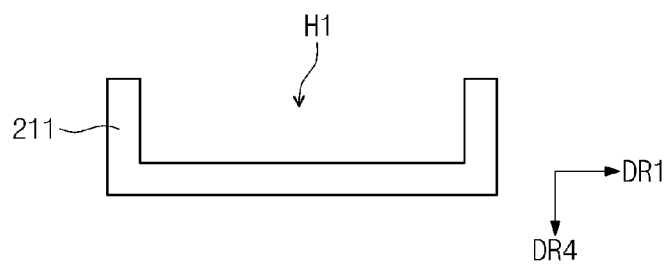
FIGS. 6C, 6E, 6G, and 6H are cross-sectional views sequentially illustrating an embodiment of the method for manufacturing the display device according to the inventive concept.
Figure 6D:
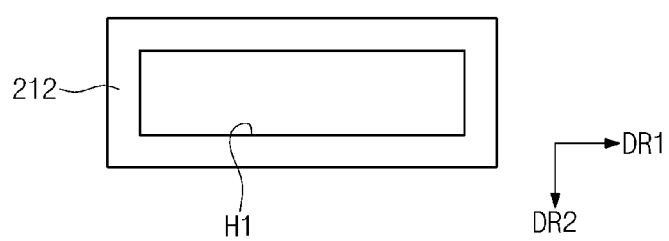
Figure 6E:
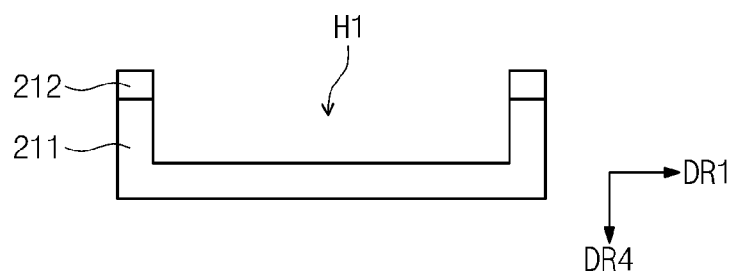
Figure 6F:
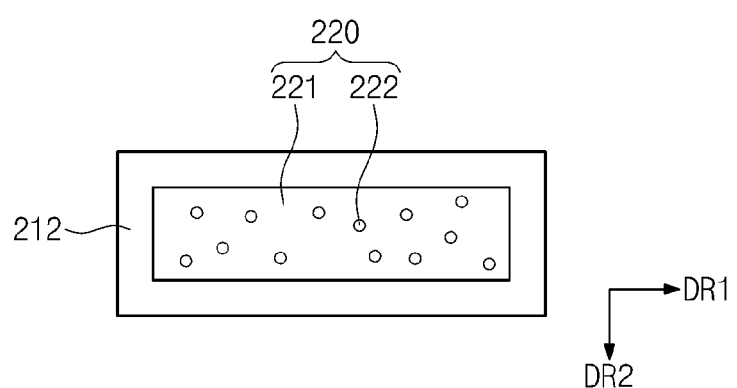
Figure 6G:
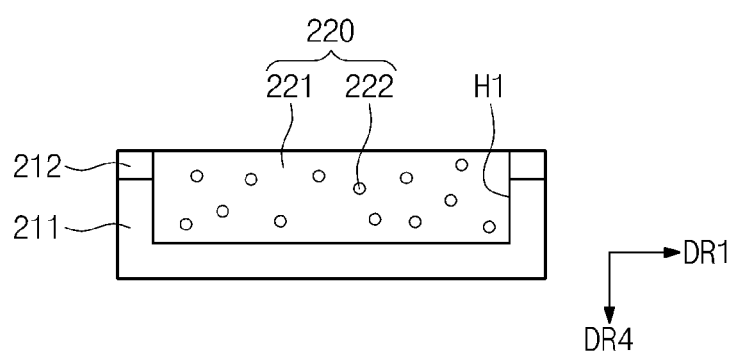

Referring to FIGS. 1, 5 and 6A, the substrate SUB is prepared (S100). The substrate SUB may include glass. The substrate SUB may have, e.g., a rectangular shape on a plane. In one embodiment, for example, the term "on a plane" may denote a shape when viewed from a top plan view or viewed in the fourth direction DR4.

Referring to FIGS. 1, 5 and 6B to 6E, the accommodation groove H1 is defined in the substrate SUB to form the cover member 210 (S200). The forming of the cover member 210 S200 may include forming the cover part 211 and forming the connecting part 212.

Referring to FIGS. 1, 5, 6B and 6C, the accommodation groove H1 is defined in the substrate SUB to form the cover part 211. The method for forming the accommodation groove H1 may be performed, e.g., through an etching. The accommodation groove H1 may have, e.g., a rectangular shape on the plane. The accommodation groove H1 may have, e.g., a depth of about 300 micrometers (μm) to about 1500 μm.

Referring to FIGS. 1, 5, 6D and 6E, the frit is provided on the cover part 211. On the plane, the frit may be provided on an area of the cover part 211 except for an area of the accommodation groove H1. In one embodiment, for example, the frit may be provided by using a mask to screen print on the cover part 211.

The frit provided on the cover part 211 is plastic-hardened. In one embodiment, for example, the frit may be plastic hardened at a temperature in a range of about 400° C. to about 700° C. The frit is not sufficiently plastic hardened at a temperature below about 400° C., and the frit is excessively hardened at a temperature over about 700° C., such that the cover member 210 may not be effectively attached to the light guide plate LGP.

Referring to FIGS. 1, 5, 6F and 6G, the wavelength conversion layer 220 is provided in the accommodation groove H1 (S300). The providing of the wavelength conversion layer 220 to the accommodation groove H1 S300 may include applying the wavelength conversion layer 220 on the accommodation groove H1 and UV curing the wavelength conversion layer 220 applied on the accommodation groove H1. The wavelength conversion layer 220 may include the resin layer 221 and the wavelength conversion member 222 provided in the resin layer 221. Although not shown, the resin layer 221 may further include at least one of an UV initiator, a dispersing agent, a deforming agent, and a scattering member.

The wavelength conversion member 222 may absorb light in a predetermined wavelength band to emit optical energy that is absorbed while returning to a ground state from an excited state. The wavelength conversion member 222 includes a phosphor or a quantum dot. In one embodiment, for example, the wavelength conversion member 222 may include at least one selected from oxynitride, nitride, silicate, aluminated, scandate, and oxyfluoride.

In an embodiment, the wavelength conversion member 222 is the phosphor and includes β-SiAlON (Si6-zALzOzN8-z), (Ba,Sr)2SiO4:Eu, or CaSc20:Ce, such that the wavelength conversion member 222 may emit excited light in a green wavelength band. In an embodiment, the wavelength conversion member 222 is the phosphor and includes CaAlSiN3:Eu, (Sr,Ca)AlSiN3:Eu, or CaAlSi(ON)3:Eu, such that the wavelength conversion member 222 may emit excited light in a red wavelength band. In an embodiment, the wavelength conversion member 222 is the phosphor and includes Y3Al5O12:Ce or Tb3Al5O12:Ce, such that the wavelength conversion member 222 may emit excited light in a yellow wavelength band. In an embodiment, where blue light is provided from the backlight unit BLU, and the wavelength conversion member 222 is the phosphor and includes Y3Al5O12:Ce or Tb3Al5O12:Ce, the excited light emitted from the wavelength conversion member 222 and the blue light may be mixed to emit white light.

In an embodiment, where the wavelength conversion member 222 is the quantum dot, the wavelength conversion member 222 may include a Group II-VI based semiconductor compound or quantum dot including ZnSe/ZnS or ZnTe/ZnSe. The wavelength conversion member 222 may include a Group III-V based semiconductor compound or quantum dot including InP/ZnS or a quantum dot including CuInS(2)/ZnS. The wavelength conversion member 222 may not include cadmium (Cd).

Figure 6H:
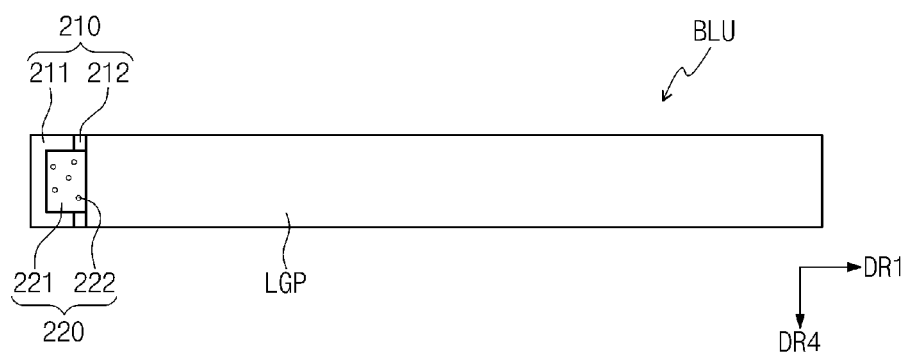

Referring to FIGS. 1, 5 and 6H, the cover member 210 is attached to the light guide plate LGP in a way such that the wavelength conversion layer 220 contacts the light guide plate LGP in operation S400. The attaching of the cover member 210 to the light guide plate LGP S400 may include applying a laser to the frit to attach the cover member 210 to the light guide plate LGP. The laser may include, e.g., an infrared laser providing a wavelength in a wavelength band of about 700 nanometers (nm) to about 800 nm.

In the method for manufacturing a conventional display device including the wavelength conversion layer, the wavelength conversion layer does not contact the light guide plate. Accordingly, in such a conventional display device, light having a converted wavelength may not be effectively provided to the light guide plate due to leakage. Accordingly, a in such a conventional display device, n amount of light provided to the display panel is small and light emission efficiency of the display device is thereby decreased.

In an embodiment of the display device manufactured by the method described herein according to the inventive concept, the wavelength conversion layer contacts the light guide plate, such that the light having the converted wavelength is effectively provided to the light guide plate and thus leakages may be substantially reduced. Accordingly, in such an embodiment, the amount of the light provided to the display panel increases to enhance the light emission efficiency of the display device.

According to the embodiments of the inventive concept, the display device may have improved light output efficiency.

According to embodiments of the method for manufacturing the display device according to the invention, the display device with improved light output efficiency may be manufactured.

Although some exemplary embodiments of the invention have been described, it is understood that the invention should not be limited to these exemplary embodiments but various changes and modifications can be made by one ordinary skilled in the art within the spirit and scope of the invention as hereinafter claimed. Thus, the above-disclosed embodiments are to be considered illustrative and not restrictive.

What is claimed is:

1. A display device comprising:
a backlight unit; and
a display panel disposed on the backlight unit,
wherein the backlight unit comprises:
a light guide plate;
a light source unit disposed adjacent to a surface of the light guide plate;
a wavelength conversion layer disposed between the light source unit and the light guide plate, wherein the wavelength conversion layer contacts the surface of the light guide plate; and
a cover member disposed between the light source unit and the light guide plate, where the cover member seals the wavelength conversion layer from being exposed outside of the cover member.

2. The display device of claim 1, wherein the light guide plate comprises:
a light incident surface;
a light opposite surface facing the light incident surface;
an emission surface connected to the light incident surface and the light opposite surface; and
a rear surface facing the emission surface,
wherein the wavelength conversion layer contacts the light incident surface.

3. The display device of claim 1, wherein the cover member comprises an accommodation groove which accommodates the wavelength conversion layer.

4. The display device of claim 1, wherein the wavelength conversion layer comprises:
a first surface contacting the light guide plate;
a second surface facing the first surface;
a third surface connected to the first surface and the second surface; and
a fourth surface connected to the first surface and the second surface and facing the third surface.

5. The display device of claim 4, further comprising:
a reflective member disposed between the wavelength conversion layer and the cover member,
wherein the reflective member is disposed between the third surface and the cover member and between the fourth surface and the cover member.

6. The display device of claim 4, wherein the cover member covers the second surface, the third surface and the fourth surface.

7. The display device of claim 4, wherein the cover member comprises:
a cover part which covers a portion of the third surface, a portion of the fourth surface, and the second surface; and
a connecting part which covers the remaining portion of the third surface and the remaining portion of the fourth surface, wherein the connecting part connects the cover part to the light guide plate.

8. The display device of claim 7, wherein the cover part comprises glass.

9. The display device of claim 7, wherein the connecting part comprises fit.

10. The display device of claim 1, wherein the wavelength conversion layer comprises:
   a resin layer; and
   a wavelength conversion member disposed in the resin layer.

11. The display device of claim 10, wherein the wavelength conversion member is a phosphor or a quantum dot.

12. The display device of claim 10, wherein the wavelength conversion member comprises a Group II-VI based semiconductor compound or a Group III-V based semiconductor compound.

13. The display device of claim 10, wherein the wavelength conversion member does not comprise cadmium.

14. The display device of claim 1, wherein the light source unit comprises:
   a light source accommodation part; and
   a light source disposed in the light source accommodation part, wherein the light source emits light.

15. The display device of claim 14, further comprising:
   a phosphor disposed in the light source accommodation part and on the light source.

16. A method for manufacturing a display device, the method comprising:
   preparing a backlight unit; and
   providing a display panel on the backlight unit,
   wherein the preparing the backlight unit comprises:
   preparing a substrate;
   forming a cover member by forming an accommodation groove in the substrate;
   providing a wavelength conversion layer in the accommodation groove; and
   attaching the cover member to the light guide plate in a way such that the wavelength conversion layer contacts the light guide plate and the wavelength conversion layer is elsewhere entirely covered by the cover member to prevent the wavelength conversion member from being exposed outside the cover member.

17. The method of claim 16, wherein the forming the cover member comprises:
   forming a cover part by the forming the accommodation groove in the substrate;
   providing frit on the cover part; and
   plastic-curing the frit provided on the cover part.

18. The method of claim 17, wherein the attaching the cover member to the light guide plate comprises applying laser to the frit.

19. The method of claim 16, wherein the providing the wavelength conversion layer comprises:
   applying the wavelength conversion layer on the accommodation groove; and
   ultraviolet curing the wavelength conversion layer applied on the accommodation groove.

20. The method of claim 16, wherein
   the substrate comprises glass, and
   the wavelength conversion layer comprises a phosphor or a quantum dot.

* * * * *